March 17, 1936.  F. A. DURAND  2,033,912

BRUSHING MACHINE

Filed Oct. 5, 1933  2 Sheets-Sheet 1

Inventor
FRED A. DURAND

March 17, 1936.  F. A. DURAND  2,033,912
BRUSHING MACHINE
Filed Oct. 5, 1933  2 Sheets-Sheet 2
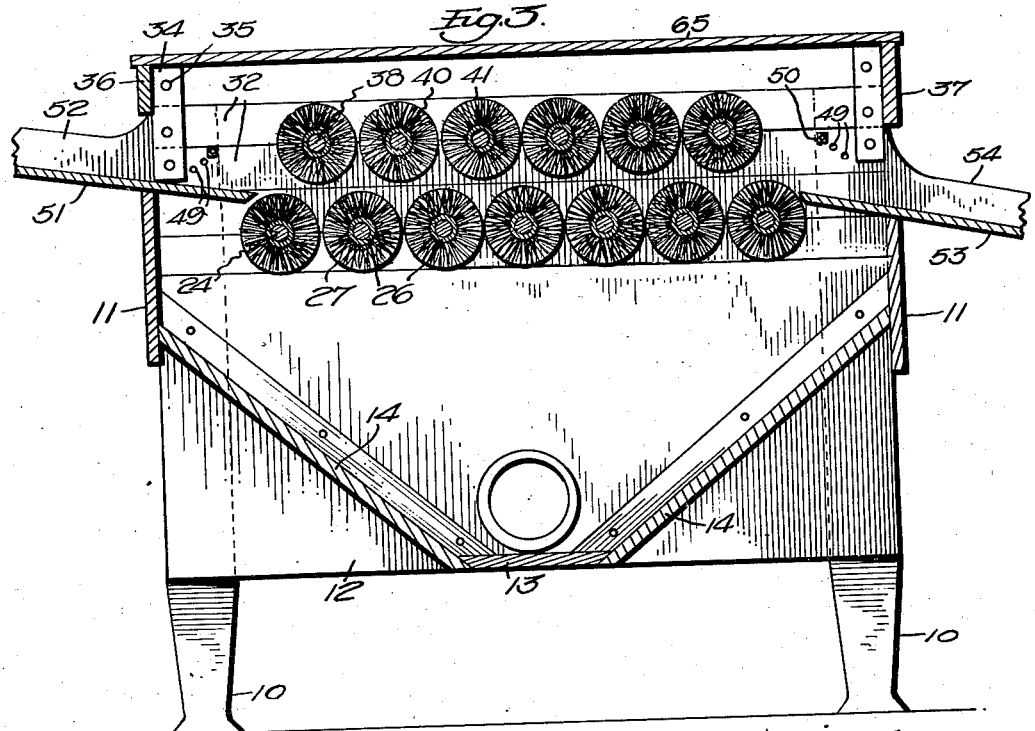
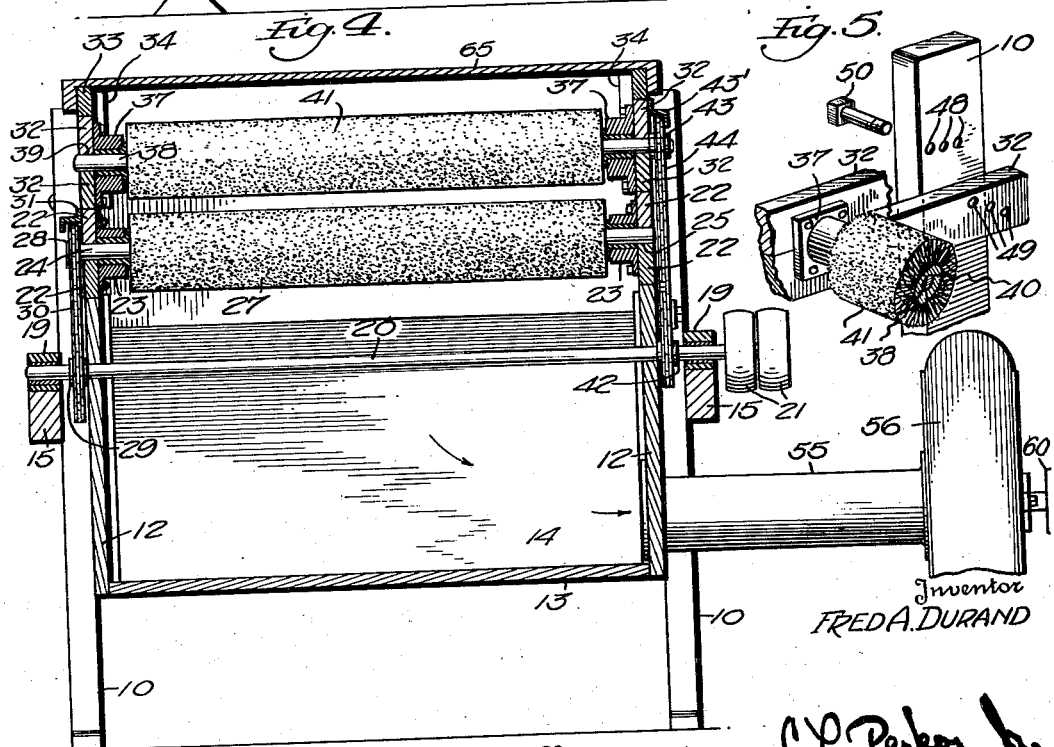
Inventor
FRED A. DURAND Patented Mar. 17, 1936

2,033,912

UNITED STATES PATENT OFFICE 2,033,912

BRUSHING MACHINE

Fred A. Durand, Woodbury, Ga.

Application October 5, 1933, Serial No. 692,341

2 Claims. (Cl. 146—202)

This invention relates to brushing machines, and more particularly to a machine for brushing and polishing fruit, such as peaches, oranges and apples.

It is becoming increasingly the practice to subject various kinds of fruit to a brushing action to improve the appearance and salability of the fruit, and this practice has been found particularly useful in connection with the polishing of oranges. Peach growers have found that the sale of peaches has increased and better prices are obtained for the fruit if they are subjected to a brushing action to remove the fur from the fruit. The brushing action removes the fur to which many customers now object, and at the same time brings out to better advantage the coloring of the fruit, and thus improves its appearance.

An important object of the present invention is to provide a novel brushing machine particularly intended for use in brushing peaches, but equally applicable for use in brushing and polishing other fruits or substantially round objects.

A further object is to provide a brushing machine of the character referred to wherein the fruit passes automatically and continuously from one end of the machine to the other to be discharged therefrom, the brushing means serving to propel the fruit through the apparatus.

A further object is to provide a machine of the character referred to wherein the path of travel of the fruit through the apparatus is defined by upper and lower series of brushes which operate to brush the fruit and propel it through the apparatus while turning it during its travel to present all sides of the fruit to the action of the brushes.

A further object is to provide a brushing machine having upper and lower series of brushes arranged in staggered relation with the brushes rotating in the same direction at different speeds whereby the adjacent portions of the brushes which contact with the fruit travel in opposite directions and at different speeds to greatly increase the efficiency of the brushing operation and to feed the fruit through the machine.

A further object is to provide novel drive means for the two series of brushes to rotate them in the same direction at different speeds.

A further object is to provide a novel casing for the brushing apparatus in combination with a blower of suitable type constantly exhausting air from the casing to discharge therefrom the fur and any foreign material which has been removed from the fruit.

Other objects and advantages of the invention will become apparent during the course of the following description.

In the drawings I have shown one embodiment of the invention. In this showing:

Figure 3 is a central vertical longitudinal sectional view,

Figure 4 is a vertical transverse sectional view taken substantially on line 4—4 of Figure 2, and, Figure 5 is a fragmentary detail perspective view of one of the brush supporting structures and associated parts.

Figure 1:
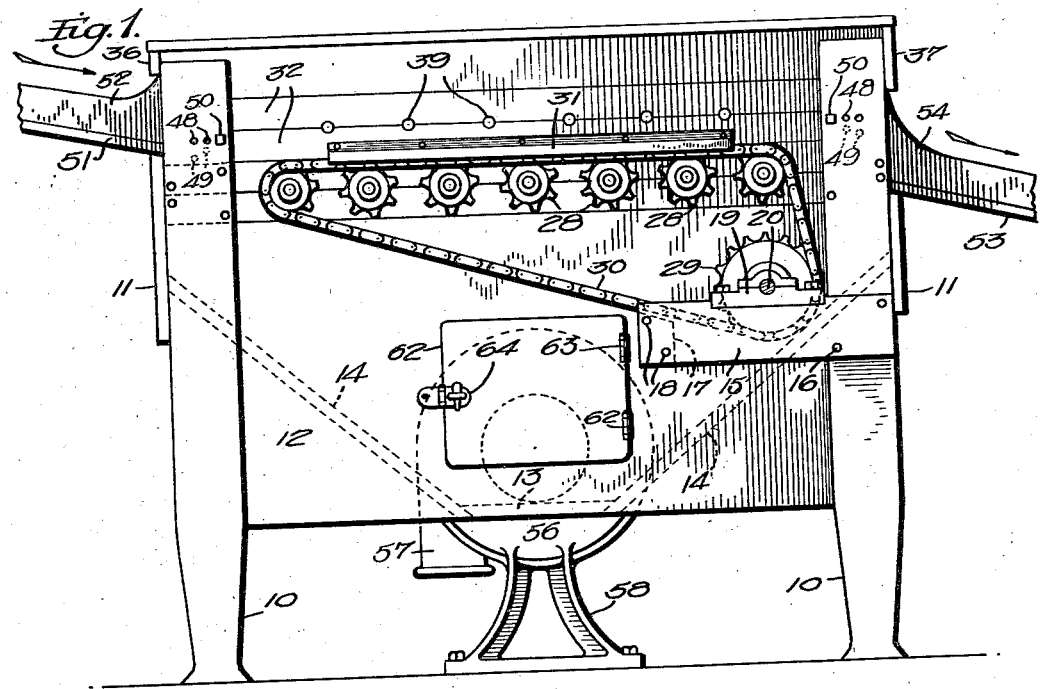
Figure 1 is a side elevation of the apparatus.

Referring to the drawings, the numeral 10 designates a plurality of legs for supporting the apparatus, the legs being preferably four in number and arranged at the corners of the machine. The legs support end walls 11 and side walls 12. The side walls are connected adjacent their central portions by a relatively narrow horizontal bottom wall 13, and sloping bottom walls 14 extend from the ends of the wall 13 to the end walls 11 to form a compartment for a purpose to be described.

A supporting member 15 is arranged at each side of the machine adjacent one end thereof and is secured at one end by bolts or other fastening elements 16 to the adjacent legs 10. A spacing block 17 is arranged between the inner end of each supporting member 15 and the adjacent side wall 12, and bolts or similar fastening elements 18 pass through the inner ends of the supporting members 15, the blocks 17 and the side walls 12.

A bearing 19 is carried on each of the supporting members 15 and a counter-shaft 20 is journaled in the bearings 19. As shown in Figure 4, a pair of pulleys 21 are mounted on the shaft 20, one of the pulleys being fixed to the shaft while the other is free to turn thereon. The arrangement of the pulleys 21 is provided if the shaft 20 is to be driven by belts from overhead drive shafts in accordance with standard practice, the belt being shiftable to the free pulley 21 when the machine is to be stopped, and to the pulley 21 which is fixed on the shaft 20 when the machine is to be operated. It will be apparent that the pulleys 21 are shown for the purpose of illustration, and that any desired drive means may be employed for the shaft 20.

At the upper extremity of each side wall 12 a pair of supporting rails 22 is arranged, and these rails are bolted to the adjacent legs 10 as at 23'. Each pair of rails 22 supports a plurality of bearings 23, and each corresponding pair of bearings supports a shaft 24. The ends of the shaft 24 project through the rails 22 and the adjacent edges of these rails are provided with semi-circular cut-out portions 25 to receive the shafts. Each shaft 24 carries a core 26 to which are attached bristles 27 to form a rotary brush. It is not essential that the rails 22 be made as separate members at each side of the machine, but this construction is preferred to permit any one or more of the brushes 27 to be removed with their associated parts when desired without removing the remaining brushes.

One end of each of the shafts 24 carries a sprocket 28 outwardly of the adjacent rails 22, as shown in Figures 1 and 4. The shaft 20 carries a relatively large sprocket 29 in the plane of the sprockets 28, and a chain 30 passes over the tops of the sprockets 28 and downwardly around the sprocket 29. It will be noted that the sprocket 29 is arranged between the adjacent side wall 12 and the corresponding support 15. A guard 31 is arranged above the sprockets 28 to insure proper engagement between the chain 30 and the teeth of the sprockets 28.

An upper structure is carried at the top of the apparatus and supports brushes operating in conjunction with the brushes 27. Referring to Figures 3 and 4, the numeral 32 designates a pair of supporting rails similar to the rails 22 and arranged thereabove. These rails form a portion of the side wall of the apparatus, in effect, and a side wall member 33 extends upwardly to form each upper rail 32. Cleats 34 secure the members 32 and 33 to each other at opposite sides and at each end of the apparatus, by means of bolts or the like 35. At the inlet end of the apparatus, to be referred to later, a relatively narrow end wall 36 extends across the apparatus and a similar, somewhat wider end wall 37 extends across the outlet end of the apparatus.

Bearings 37 are secured to the upper rails 32 and support shafts 38 which project through complementary cut-out openings 39 formed in the rails 32. Each of the shafts 38 carries a core 40 to which are secured bristles 41, thus forming upper brushes operating in conjunction with the lower brushes 27. It will be noted that the number of the upper brushes is one less than the number of the lower brushes, and the two sets of brushes are arranged in staggered relation to define a path through which the fruit or other articles are adapted to pass in a manner to be described.

As previously stated, the shaft 20 carries the sprocket 29 at one side of the apparatus, and a similar smaller sprocket 42 is carried by the shaft 20 adjacent the opposite side of the apparatus. At the corresponding side of the apparatus, each shaft 38 carries a sprocket 43 and a chain 44 passes over the tops of the sprockets 43 and around the sprocket 42. A guard 43' is preferably arranged over the sprockets 43 to maintain the chain 44 in engagement therewith. The chain 44 may be provided with an idler take-up sprocket 45 carried by a bearing member 46 adjustably secured to the casing side walls 12 by bolts 47.

The upper structure previously described is arranged above the lower structure and is vertically adjustable with respect thereto to take care of articles of various sizes. Referring to Figures 1, 2, 3 and 5, it will be noted that the legs 10 are provided near their upper ends with a series of horizontally arranged openings 48, while the end of each lower rail 32 is provided with a series of openings 49 arranged in an angular line, the horizontal distance between the openings 49 being equal to the horizontal distance between the adjacent openings 48. Bolts 50 are adapted to be selectively arranged in the openings 48 and 49 to vary the height of the rails 32 and their associated brushes with respect to the lower part of the apparatus. For example, if the bolts are arranged in the uppermost openings 49, and the innermost openings 48, the rail 32 will be in its lowermost position to provide the minimum space between the sets of brushes. The bolts may pass through the central openings 48 and 49 to elevate the upper structure somewhat and may be arranged in the remaining openings 48 and 49 to still further elevate the upper structure to permit the passage of still larger sizes of fruits or other articles through the apparatus.

At the inlet side of the apparatus there is arranged a feed chute 51 having side walls 52 extending to the end of the apparatus. The bottom of the chute extends into the apparatus just above the end wall 11 and into proximity to the adjacent end brush 27 to deliver fruit thereto. A similar discharge chute 53 is arranged at the outlet end of the apparatus and includes side walls 54 extending to the adjacent end of the apparatus. The bottom of the chute extends into the apparatus over the end wall 11 to a point in proximity to the adjacent brush 27 to receive the fruit or other articles therefrom.

Figure 2:
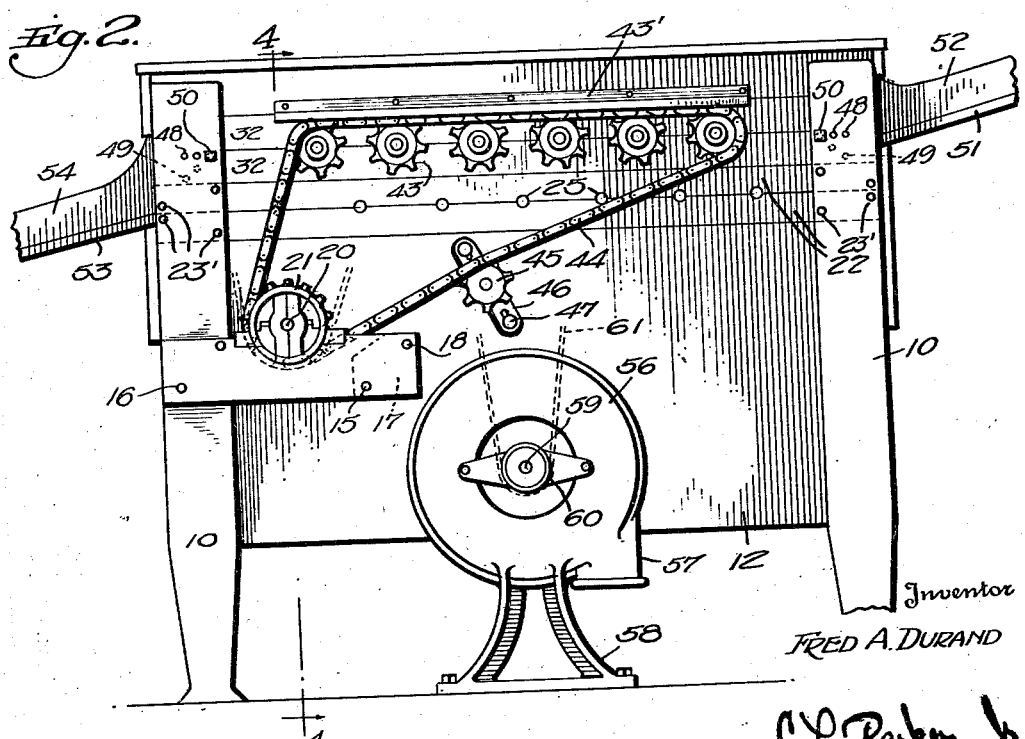
Figure 2 is a similar view showing the opposite side of the apparatus.

An exhaust conduit 55 communicates with the bottom of the compartment formed by the bottom, end and side walls, the conduit 55 extending through one of the side walls 12. This conduit extends to the intake of a blower 56, the blower being provided with an outlet or exhaust conduit 57 through which material is suitably piped from the building. The blower is supported upon a base 58, as shown in Figures 1 and 2. The blower includes a shaft 59 to which is secured a pulley 60, and the pulley may be driven in any suitable manner, as by means of a belt 61. It is preferred that means be provided for permitting access to the compartment referred to, and for this purpose, the side wall 12 opposite the blower is provided with a door 62, preferably hinged to the adjacent side wall 12, as at 63, and provided with suitable latching means 64.

The upper structure is preferably provided with a cover 65, as clearly shown in Figures 3 and 4. This cover, of course, is not essential to the operation of the apparatus but is preferably provided to prevent the upper brushes 41 from throwing fur from the peaches, or other foreign material, into the room in which the apparatus is operating.

The operation of the apparatus is as follows:

The shaft 20 is driven in any suitable manner, as previously stated. The sprockets 28 and 43 are preferably of the same size, but the sprocket 29 is preferably considerably larger than the sprocket 42. Accordingly the lower brushes 27 will be driven at a somewhat greater speed than the brushes 41, but it will be apparent that the brushes are all rotated in the same direction, for example, in a clockwise direction as viewed in Figure 3. The lower portion of each upper brush 41 accordingly moves toward the left while the upper portion of each brush 27 moves toward the right.

The apparatus is particularly intended for use in removing the fur from peaches, but it will be apparent that it may be used on any substantially circular article. The peaches or other articles are fed continuously to the apparatus through the chute 51 and are delivered to the top of the first brush 27. The rotation of the brushes 27 in a clockwise direction tends to move the fruit toward the right, as viewed in Figure 3, while the similar rotation of the upper brushes 41 tends to move the fruit toward the left. Since the two sets of brushes are rotated at different speeds, it will be apparent that the action of the brushes will result in relatively slowly moving the fruit toward the right end of the apparatus as viewed in Figure 3. The action of the brushes 41, however, rotates the articles themselves as they pass between the brushes, and the result of this action is that the articles are continually turned throughout their movement through the apparatus. Before an article can travel entirely through the apparatus, therefore, every portion of the article will be subjected to the action of the bristles, thus providing a thorough and efficient brushing action. As the fruit or other articles reach the right hand end of the apparatus they are discharged to the chute 53 from which they are collected in suitable receptacles. In the case of peaches, the brushing action thoroughly removes the fur to render the fruit less objectionable to handle and improves the appearance of the fruit by bringing out the coloring of the skins thereof.

While the brushes could be utilized for brushing the articles and effecting their movement through the apparatus if the brush is rotated in opposite directions at different speeds, this operation is not preferred. If the lower brushes are rotated in a clockwise direction while the upper brushes are rotated in a counter-clockwise direction and at substantially slower speed, the articles will be brushed and will be moved toward the discharge end of the apparatus. With such apparatus, however, the fruit will move far more rapidly, and it has been found that a much longer apparatus will be required to provide the same degree of efficiency in the brushing operation. By rotating the brushes in the same direction in the manner previously described, the bodily movement of the articles through the apparatus is retarded to increase the brushing action in a machine of a given length, while at the same time, the fruit will be more effectively constantly turned during its travel through the apparatus, thus insuring the proper brushing of all portions of the fruit.

As previously stated, the apparatus is particularly intended for use in brushing peaches, and in such case it is desirable to prevent the fur removed from the peaches from floating around the building in which the apparatus is employed. With the present apparatus, the blower 56 collects and discharges fur or other foreign material from the compartment beneath the brushes, and the material thus collected may be piped from the building to be discharged into the open air. The blower maintains a flow of air into all portions of the apparatus which are not closed to the atmosphere, such, for example, in the inlet opening between the walls 11 and 36 and the outlet opening between the walls 11 and 37, and the currents of air thus provided effectually prevent the fur or other foreign material from escaping into the room.

The use of the apparatus for cleaning peaches requires only relatively slight vertical adjustment of the upper structure, and the use of the idler sprocket 45 is not essential. This element is preferably employed however, to maintain the chains 44 sufficiently taut under all conditions to prevent it from becoming disengaged from any of the sprockets around which it passes.

As previously stated, the rails 22 and 32 are preferably arranged in pairs, although they may be made unitary, as will be apparent. With the structure shown and described, however, any one of the upper brush units may be removed by removing the upper rails 32. Similarly, any of the lower brush units may be removed by removing the upper rails 22, the upper structure being vertically removable by disconnecting the bolts 50 to provide access to the upper brushes and associated parts.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:

1. In a dry brushing machine, a supporting framework, two sets of rotary brushes operatively mounted within said frame-work, the brushes of each set having their axes parallel to the plane of the axes of the other set of brushes, a feed chute integral with said supporting framework and disposed at right angles to said brushes, said chute delivering fruit between the upper and lower sets of brushes; means for rotating said brushes in the same direction with the lower set rotating at a higher speed than the brushes of the upper set the direction of rotation of the lower set being such as to feed fruit through the machine, whereby said lower set of brushes urges fruit through the machine and the upper set exerts a retarding influence on the passage of fruit therethrough, the spacing of the two sets being such that all of said brushes contact the fruit to clean the same; and a discharge chute receiving fruit from between said brushes and directing it from the machine.

2. In a dry brushing machine, a supporting framework, two sets of rotary brushes operatively mounted within said framework, the brushes of each set having their axes parallel to each other in a common horizontal plane parallel to the plane of the axes of the other set of brushes, the brushes of the two sets being offset from each other with each upper brush lying intermediate the vertical planes of the axes of an adjacent pair of lower brushes, a feed chute integral with said supporting framework and disposed at right angles to said brushes, said chute delivering fruit between the upper and lower sets of brushes; means for rotating said brushes in the same direction with the lower set rotating at a higher speed than the brushes of the upper set the direction of rotation of the lower set being such as to feed fruit through the machine, whereby said lower set of brushes impels fruit through the machine and the upper set exerts a retarding influence on the passage of fruit between the brushes, the spacing of the two sets being such that all of said brushes contact the fruit to clean the same; and a discharge chute for receiving fruit from between said brushes and directing it from the machine.

FRED A. DURAND.